EASY RELEASE DEVICE FOR A SOCKET WRENCH

Original Filed Feb. 13, 1969

INVENTOR.
GABRIEL M. LAPOINTE

BY

Marvin S. Blodgett
ATTORNEY

United States Patent Office

Re. 28,037
Reissued June 11, 1974

28,037

EASY RELEASE DEVICE FOR A SOCKET WRENCH

Gabriel M. La Pointe, Worcester, Mass., assignor to Parker Mfg. Company, Worcester, Mass.

Original No. 3,564,954, dated Feb. 23, 1971, Ser. No. 798,898, Feb. 13, 1969. Application for reissue Jan. 29, 1973, Ser. No. 327,302
Int. Cl. B25b *13/46*
U.S. Cl. 81—61 7 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a push button release snap-on drive square for a ratchet operated socket wrench that projects from opposite sides of the wrench to permit sockets, screwdrivers, hand-operated knobs or the like to be detachably mounted on opposite sides of the wrench for alternate use. The socket is detached from the drive square by pressing the drive square in a direction parallel to the axis of the socket.

BACKGROUND OF THE INVENTION

The field of the invention is tools in general, and in particular, wrenches having a handle and a driving member such as a drive square with or without a ratchet.

The drive square of the present invention is useful with torque wrenches such as that disclosed in U.S. Pat. No. 3,308,690. The prior art socket wrench drive squares consisted essentially of a square piece of metal with a longitudinally extended axis and a plurality of holes bored into at least one face of the drive square perpendicular to the longitudinal axis and at different heights thereon. Into each hole an individual spring and retaining ball was inserted and retained so that a portion of the biased ball protruded above a longitudinal surface of the drive square.

The release mechanism of the prior art drive squares had certain limitations. In one case, if the combination of the retaining ball and bias spring applied too much pressure to a groove inside the wrench socket, it was very difficult to remove the wrench socket from the drive square. In another case, if the tension was not great enough, it was very difficult to hold the socket on the drive square when pressure was applied to the wrench. In a third case, with a quick release mechanism, such as Sears, under certain conditions, the socket can lock on the square and be practically impossible to remove. These and other difficulties experienced with the prior art devices have been obviated in a novel manner by the present invention.

It is, therefore, an outstanding object of the invention to provide an easy release snap-on drive square for use with sockets and ratchet drive wrenches.

Another object of the present invention is to provide a socket wrench drive square which releases the socket from the wrench by a push button action.

With these and other objects in view, as will be apparent to those skilled in the art, the invention resides in the combination of parts set forth in the specification and covered by the claims appended hereto.

SUMMARY OF THE INVENTION

According to the present invention, a drive square is provided for use with socket wrenches and ratchet drive handle wherein the drive square comprises an elongated square piece of metal with a hollow core extending longitudinally, three holes in at least one face bored perpendicular to the longitudinal axis at the center and ends thereof, retaining balls in the bored holes, a bar extending the length of the inner core and contacting the rear surfaces of each of the retaining balls and either an undulating spring or a series of coil springs pressing against the bar and the balls, respectively.

In order to release a socket being held by the retaining balls at either end of the drive square, it is necessary only to press against the end of the drive square whereupon the retaining ball in the center thereof depresses the bar and spring and thereby releases the pressure on the retaining balls at the ends of the drive square. When the pressure is released on the balls retaining the socket wrench, the socket falls loose.

BRIEF DESCRIPTION OF THE DRAWINGS

The character of the invention, however, may be best understood by reference to one of its structural forms, as illustrated by the accompanying drawings, in which.

Figure 1:
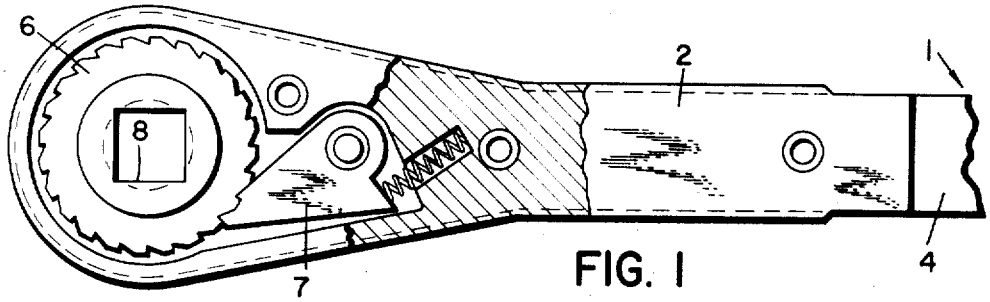
FIG. 1 is a plan view of a wrench, partly in horizontal section, with the drive square removed.
Figure 2:
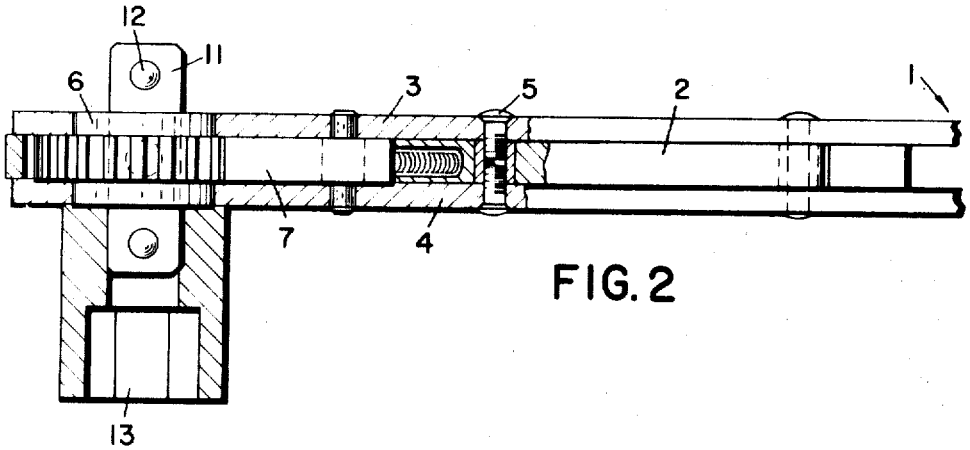
FIG. 2 is a longitudinal vertical section of the same wrench with the driving square in the wrench and a socket in place.

With particular reference to FIGS. 1 and 2, the ratchet wrench useful with the present invention comprises a handle 1 which is simply a rigid handle of the usual construction or can be a torque limiting handle, preferably of the construction shown in U.S. Pat. No. 3,308,690. The ratchet end of the wrench comprises a three-piece housing formed of a body portion 2, with identical cover plates 3 and 4 secured to opposite sides thereof by screws 5. A ratchet wheel 6 having a square hole 8 in the center thereof is rotatably supported in the body portion between the two cover plates where it is engaged by a spring-pressed pawl 7 for rotation in a single direction.

Since the two sides of the wrench are of identical construction, the rotation of the ratchet wheel can be changed from clockwise to counter-clockwise or vice versa, as used by the operator by merely inverting the wrench.

As shown in FIG. 2, a snap-on drive square 11 is inserted in square hole 8 for connection to a socket, screwdriver, handhold or other device as, for example, the socket 13.

Figure 3:
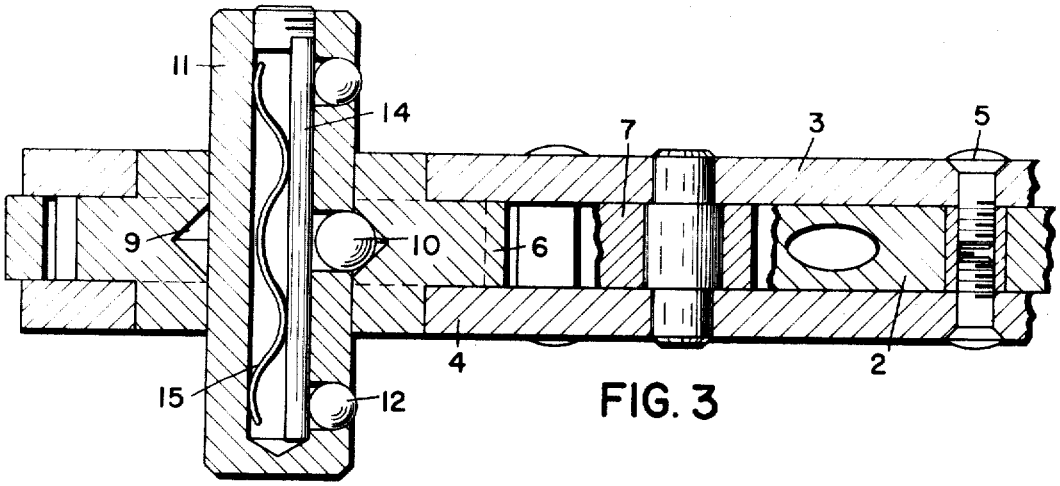
FIG. 3 is an enlarged view of a portion of FIG. 2 with the drive square shown in section.

The snap-on drive square 11 is shown in greater detail in FIG. 3, wherein the ratchet wheel 6 having the square hole 8 through the middle of it is enlarged by a circular groove 9 in the central plane of the ratchet wheel to receive the larger or higher retaining ball 10 in the middle of the drive square 11. Retaining balls 12 are located near each end of the snap-on drive 11 for retaining sockets. The drive square 11 has a central hole extending throughout almost the entire length of it and located within the central hole is a half-round bar 14 that is pressed against the balls 10 and 12 by an undulated spring 15 or coiled springs.

DESCRIPTION OF THE PREFERRED EMBODIMENT

The snap-on drive square of the present invention is inserted into the ratchet wheel of a wrench by pressing it into the square hole 8 until the ball 10 connects the groove 9. When a socket 13 is to be connected to the lower end of the drive square, it is necessary only to press down upon the upper surface of the drive square with the thumb so that the retaining ball 10 is retracted by rolling against the slanted surface of groove 9. The retraction of ball 10 depresses half-round bar 14 which, in turn, compresses spring 15. With the depression of bar 14, the smaller balls 12 are loose in their bored holes, and socket 13 is inserted thereon without difficult. When the thumb pressure is released from the top of the drive square, the undulated spring 16 presses against the bar 14 which, in turn, presses against the ball 10 and forces it back into its proper position in groove 9. Simultaneously, the ball 12 engages a groove on the inner wall of the socket 13.

To release the socket 13 from the drive square 11, it is necessary only to press down on the top of the drive square with the thumb until the pressure is released from the ball 12 and the socket 13 falls free.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A ratchet operated socket wrench comprising a handle with a ratchet wheel in the central plane thereof, a square hole through the middle of said ratchet wheel, an interior enlargement in said hole adapted to receive a snap-on drive square, said snap-on square comprising a central retaining ball adapted to engage the interior enlargement of the square hole, retaining balls in each end of the drive square adapted to receive a snap-on attachment and means for urging all of said balls outwardly simultaneously.

2. The wrench of claim 1, wherein said means for urging comprises a central hole extending throughout the major portion of the drive square and a spring-pressed bar in said hole urging the three balls outwardly.

3. The wrench of claim 2, wherein the central retaining ball is slightly larger than those near the end of the drive square.

4. A snap-on square adapted to be received in a square hole of the ratchet wheel of a ratchet operated socket wrench, said drive square having a central retaining ball midway of its length and retaining balls near each end, and means for urging all of said balls outwardly simultaneously.

5. The snap-ont drive square of claim 4, wherein said means for urging comprises a spring-pressed bar extending longitudinally inside the square hole engaging all three balls whereby they are urged outwardly.

6. The snap-on drive square of claim 5, wherein the central retaining ball is slightly larger than those near the end of the drive square.

*7. A ratchet operated socket wrench comprising a handle with a ratchet wheel in the central plane thereof, a non-circular hole through the middle of said ratchet wheel, an interior enlargement in said hole adapted to receive a snap-on drive square, said snap-on drive square comprising a central retaining detent adapted to engage the interior enlargement of the hole, retaining detents in each end of the drive square adapted to receive a snap-on attachment and means for urging all of said detents outwardly simultaneously.*

References Cited

The following references, cited by the Examiner, are of record in the patented file of this patent or the original patent.

UNITED STATES PATENTS

| | | | |
|---|---|---|---|
| 1,578,065 | 3/1926 | Bemus et al. | 81—61 |
| 1,807,134 | 5/1931 | Pfauser | 81—61 |
| 1,459,291 | 6/1923 | Hall | 81—61 |

JAMES L. JONES, Jr., Primay Examiner